(12) United States Patent
Blitzer et al.

(10) Patent No.: US 9,430,125 B1
(45) Date of Patent: Aug. 30, 2016

(54) SIMPLIFYING RULES GENERATION FOR AN EVENT-BASED ANALYSIS ENGINE

(75) Inventors: Aharon Blitzer, Shoham (IL); Aviram Katz, Kiryat Ono (IL); Amit Lieberman, Raanana (IL); Amihai Hadar, Herzelia (IL); Cynthia L. Toryu, Natick, MA (US); Senya Touretski, Ramat Gan (IL); Oz Garinkol, Brookline, MA (US)

(73) Assignees: EMC International Company, Hamilton (BM); EMC Corporation, Hopkinton, MA (US)

( * ) Notice: Subject to any disclaimer, the term of this patent is extended or adjusted under 35 U.S.C. 154(b) by 3 days.

(21) Appl. No.: 13/534,488

(22) Filed: Jun. 27, 2012

(51) Int. Cl.
*G06F 3/0484* (2013.01)
*G06F 17/30* (2006.01)
*G06F 9/44* (2006.01)

(52) U.S. Cl.
CPC .............. *G06F 3/0484* (2013.01); *G06F 8/34* (2013.01); *G06F 17/30507* (2013.01)

(58) Field of Classification Search
CPC .. G06F 3/0484; G06F 8/20; G06F 17/30507; G06F 8/34
USPC ........................................................ 715/735
See application file for complete search history.

(56) References Cited

U.S. PATENT DOCUMENTS

| | | | |
|---|---|---|---|
| 7,076,685 B2 | 7/2006 | Pillai et al. | |
| 7,409,379 B1 | 8/2008 | Katzer | |
| 7,482,931 B2 | 1/2009 | Lin | |
| 7,606,813 B1 * | 10/2009 | Gritsay et al. | |
| 7,613,726 B1 * | 11/2009 | Spivak et al. | |
| 7,668,953 B1 * | 2/2010 | Sinclair et al. | 709/224 |
| 7,761,594 B1 * | 7/2010 | Mowat | 709/238 |
| 7,836,427 B1 | 11/2010 | Li et al. | |
| 8,224,761 B1 * | 7/2012 | Rockwood | 706/47 |
| 8,949,168 B1 | 2/2015 | Blitzer et al. | |
| 9,098,804 B1 | 8/2015 | Blitzer et al. | |
| 9,195,631 B1 | 11/2015 | Blitzer et al. | |
| 2004/0093581 A1 * | 5/2004 | Nielsen et al. | 717/101 |
| 2004/0117407 A1 * | 6/2004 | Kumar et al. | 707/200 |
| 2004/0250258 A1 * | 12/2004 | Raghuvir et al. | 719/315 |
| 2005/0125688 A1 * | 6/2005 | Ogawa et al. | 713/200 |
| 2005/0246304 A1 * | 11/2005 | Knight et al. | 706/47 |
| 2006/0179028 A1 | 8/2006 | Bram et al. | |
| 2006/0179042 A1 | 8/2006 | Bram et al. | |
| 2006/0179058 A1 | 8/2006 | Bram et al. | |
| 2007/0094199 A1 * | 4/2007 | Deshpande et al. | 706/47 |
| 2007/0198478 A1 | 8/2007 | Yu et al. | |

(Continued)

OTHER PUBLICATIONS

Blitzer et al.; "Providing Historical Data to an Event-Based Analysis Engine;" U.S. Appl. No. 13/429,524, filed Mar. 26, 2012; 17 pages.

(Continued)

*Primary Examiner* — Li Sun
(74) *Attorney, Agent, or Firm* — Daly, Crowley, Mofford & Durkee, LLP (57) ABSTRACT

In one aspect, a method, includes receiving and storing objects in a repository, translating objects in an object repository format to a graphical user interface (GUI) format, rendering the GUI format to a user, receiving a rule from the user using the GUI format, translating the rule in the GUI format to a rule repository format, storing rule in the rule repository format in a rule repository and compiling the rule in the rule repository format into a format that is acceptable for processing by the event based analysis engine.

19 Claims, 9 Drawing Sheets

(56) References Cited

U.S. PATENT DOCUMENTS

| | | | |
|---|---|---|---|
| 2007/0260470 | A1 | 11/2007 | Bornhoevd et al. |
| 2008/0196006 | A1 | 8/2008 | Bates et al. |
| 2009/0019000 | A1* | 1/2009 | Arends et al. ............. 707/3 |
| 2009/0049508 | A1 | 2/2009 | Kaminsky et al. |
| 2009/0113387 | A1* | 4/2009 | Ziegler ............. 717/109 |
| 2009/0150319 | A1 | 6/2009 | Matson et al. |
| 2009/0171879 | A1 | 7/2009 | Bullen et al. |
| 2009/0287628 | A1 | 11/2009 | Indeck et al. |
| 2010/0128676 | A1 | 5/2010 | Wu et al. |
| 2010/0175055 | A1* | 7/2010 | Wang et al. ............. 717/137 |
| 2010/0198636 | A1 | 8/2010 | Choudhary et al. |
| 2011/0138291 | A1* | 6/2011 | Twiddy et al. ............. 715/735 |
| 2011/0141913 | A1* | 6/2011 | Clemens et al. ............. 370/242 |
| 2011/0167433 | A1 | 7/2011 | Appelbaum et al. |
| 2011/0191692 | A1 | 8/2011 | Walsh et al. |
| 2011/0238452 | A1 | 9/2011 | Ziade et al. |
| 2012/0131185 | A1 | 5/2012 | Petersen et al. |
| 2012/0291008 | A1 | 11/2012 | Bates et al. |
| 2012/0317504 | A1* | 12/2012 | Patel et al. ............. 715/762 |
| 2012/0317541 | A1 | 12/2012 | Kaulgud et al. |
| 2013/0132108 | A1 | 5/2013 | Solilov et al. |
| 2013/0191185 | A1 | 7/2013 | Galvin |
| 2014/0165140 | A1 | 6/2014 | Singla et al. |

OTHER PUBLICATIONS

Blitzer et al.; "Managing a Memory of an Even-Based Analysis Engine;" U.S. Appl. No. 13/534,481, filed Jun. 27, 2012; 22 pages.

Blitzer et al.; "Simplifying Rules Generation for an Even-Based Analysis Engine by Allowing a User to Combine Related Objects in a Rule;" U.S. Appl. No. 13/533,159, filed Jun. 26, 2012; 29 pages.

Response to Office Action dated Jun. 6, 2014 corresponding to U.S. Appl. No. 13/429,524; Response Filed on Oct. 6, 2014, 13 Pages.

Office Action date Nov. 6, 2014 corresponding to U.S. Appl. No. 13/429,524; 23 Pages.

Blitzer et al.; "Using Data Aggregation to Manage a Memory for an Event-Based Analysis Engine;" U.S. Appl. No. 13/727,855, 24 pages.

Office Action dated Jun. 6, 2014 corresponding to U.S. Appl. No. 13/429,524, 13 pages.

Office Action dated Jul. 17, 2014 corresponding to U.S. Appl. No. 13/534,481, 10 pages.

Office Action dated Feb. 13, 2014 corresponding to U.S. Appl. No. 13/533,159, 14 pages.

Office Action from the U.S. Patent and Trademark Office dated Dec. 10, 2014 corresponding to U.S. Appl. No. 13/727,855; 14 Pages.

Tucker et al., "Method of Processing Events for Real-Time Analysis of Key Processes of an Enterprise;" Patent Application AU 2010212459; filed Aug. 20, 2010; Published Mar. 24, 2011; 34 Pages.

Response to Office Action dated Jul. 17, 2014 corresponding to U.S. Appl. No. 13/534,481; Response Filed on Oct. 20, 2014; 11 Pages.

Final Office Action dated Sep. 24, 2014 corresponding to U.S. Appl. No. 13/533,159; 22 Pages.

Response to Office Action dated Feb. 13, 2014 corresponding to U.S. Appl. No. 13/533,159, 13 pages.

Response to Final Office Action dated Nov. 6, 2014 corresponding to U.S. Appl. No. 13/429,524; Response filed on Mar. 6, 2015; 13 Pages.

Request for Continued Examination dated Mar. 6, 2015 corresponding to U.S. Appl. No. 13/429,524; 3 Pages.

Office Action dated Apr. 30, 2015 corresponding to U.S. Appl. No. 13/429,524; 37 Pages.

Notice of Allowance dated Nov. 5, 2014 corresponding to U.S. Appl. No. 13/534,481; 9 Pages.

Appeal Brief in Response to the Final Office Action dated Sep. 24, 2014; Appeal Brief filed Jun. 12, 2015 corresponding to U.S. Appl. No. 13/533,159; 21 Pages.

Response to Office Action dated Dec. 10, 2014 corresponding to U.S. Appl. No. 13/727,855; Response filed on May 11, 2015; 19 Pages.

Notice of Allowance dated May 29, 2015 corresponding to U.S. Appl. No. 13/727,855; 19 Pages.

Response to Office Action dated Apr. 30, 2015 corresponding to U.S. Appl. No. 13/429,524; Response filed on Jul. 22, 2015; 4 Pages.

Notice of Allowance dated Sep. 3, 2015 corresponding to U.S. Appl. No. 13/429,524; 8 Pages.

Notice of Allowance dated Oct. 8, 2015 corresponding to U.S. Appl. No. 13/533,159; 14 Pages.

\* cited by examiner

- Host
- -Host disks
- -Host File Systems
- -Host Applications
  - --MSSQL
  - --Oracle
- -Host Processors

Edit Alert Trigger – Predictive Time                                    216b

1. Select attribute to predict
   [Type attribute or click Browse]  [Browse]

2. Set threshold
   [Select Value Type ▽]  [Specify Value ▽]  [Select Units ▽]

3. Specify when to send alert
   [Select Value Type ▽]  [Specify Value ▽]  [Select Units ▽]

4. Specify conditions filter for selected event or attribute group (Optional)
   [                                    ]
   [Edit Conditions Filter]

5. Select prediction method
   ⦿ Number of Samples (Recommended)
      [Static Value ▽]  [11]
   ○ Time Period
      [Select Value Type ▽]  [Specify Value ▽]  [Days ▽]

Note: When you select a Parameter Value Type, the system will generate a unique parameter name.

[OK]  [Cancel]  [Help]

216c

Edit Alert Trigger - Event/Polling did not Occur

1. Select what you want to monitor
   - ● Event did not occur
     - ● Backup Job
     - ○ Recovery Point
   - ○ Attribute group data is not collected
     - ○ Status Attributes
     - ○ Configuration Attributes
     - ○ Performance Attributes 2. Specify conditions filters for selected event or attribute group (Optional)

```
           Host.Configuration.hostname Contains NYC
   AND     File System.Configuration.raidtype Is M2
   AND     File System.Configuration.Allocated Space < 16B
   ```

[Edit Conditions Filter]

3. Select interval
   - ● Time Period
     - [Select Value Type ▽] [Specify Value ▽] [Days ▽]
   - ○ Number of Samples
     - [Select Value Type ▽] [Specify Value]

[OK] [Cancel] [Help]

SIMPLIFYING RULES GENERATION FOR AN EVENT-BASED ANALYSIS ENGINE

BACKGROUND

An event-based analysis engine reacts to one or more events. For example, if an event occurs, the event-based analysis engine performs an action based on a rule. In one particular example, the event may be based on historical information.

SUMMARY

In one aspect, a method, includes receiving and storing objects in a repository, translating objects in an object repository format to a graphical user interface (GUI) format, rendering the GUI format to a user, receiving a rule from the user using the GUI format, translating the rule in the GUI format to a rule repository format, storing rule in the rule repository format in a rule repository and compiling the rule in the rule repository format into a format that is acceptable for processing by the event based analysis engine.

In another aspect, an article includes a non-transitory machine-readable medium that stores executable instructions. The instructions cause a machine to receive and store objects in a repository, translate objects in an object repository format to a graphical user interface (GUI) format, render the GUI format to a user, receive a rule from the user using the GUI format, translate the rule in the GUI format to a rule repository format, store rule in the rule repository format in a rule repository and compile the rule in the rule repository format into a format that is acceptable for processing by the event based analysis engine.

In a further aspect, an apparatus includes circuitry configured to receive and store objects in a repository, translate objects in an object repository format to a graphical user interface (GUI) format, render the GUI format to a user, receive a rule from the user using the GUI format, translate the rule in the GUI format to a rule repository format, store rule in the rule repository format in a rule repository and compile the rule in the rule repository format into a format that is acceptable for processing by the event based analysis engine.

DETAILED DESCRIPTION

An event-based analysis engine uses rules to evaluate the events. The rules are written in a particular format that is specific to the type of event-based analysis rules engine product being used. Thus, it is complicated for a user who is a non-developer to add or even manage the rules. For example, the user would need an extensive knowledge of the domain and the way the objects and events are stored in the particular event-based analysis engine being used by the user. In order to generate a rule the user would need to know the correct object name and attributes that exists in the product and the way to map between them. Additionally, in order to generate a complex rule that combines two objects from different domains, the user would need to merge between two different objects, know how those objects relate to each other and how to match between relevant attributes.

Described herein are techniques to generate rules for an event-based analysis engine. For example, the techniques described herein are an intuitive and user friendly way that enable the user to easily configure rules using a graphical user interface (GUI) on the objects that are either monitored by the system or added for monitoring by third party products for example, using an expansion service (agent). In another example, the techniques described herein combine several objects that enable the user to easily configure rules using a graphical user interface (GUI) on the objects that are either monitored by the system or added for monitoring by third party products, for example, using an expansion service (agent). The GUI described herein displays the hierarchy as known/familiar by the user. Additionally, for a related object the GUI described herein displays the relationships between different objects in an intuitive way. In one particular example, an object is displayed with its related objects rendered underneath the object in a hierarchical tree, for example, so that it will be easy for the user to define a rule that is built by two different objects with a relationship without the need to define the merge condition in an unfamiliar domain. When the user chooses a related object, the system selects the object and the related objects, does an internal merge between them and intersects the related object according to its context (parent object).

The user can navigate from the top level object to its components and selects the required component. When the user chooses a component, the system selects the object and its parents and does an internal merge between them.

Figure 1:
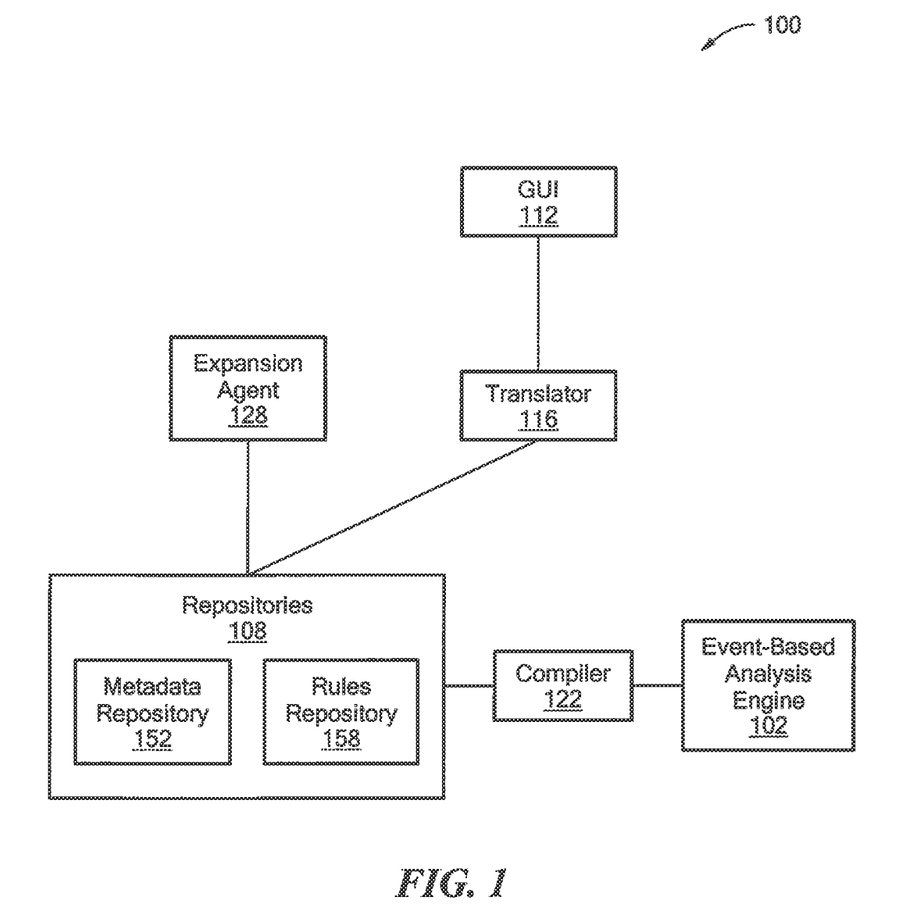
FIG. 1 is a block diagram of an example of a system for generating rules for an event-based analysis engine.

Referring to FIG. 1, a system 100 includes an event-based analysis engine 102, repositories 108, a GUI component 112, a translator 116, a compiler 122 and an expansion agent 128. The system 100 allows a user with no programming skills to generate or modify a rule for use by the event-based analysis engine 102.

The repositories 108 describe the definitions of the different domain objects and additionally describe the relationship between the different domain objects and between the objects and their components in the same domain. As used herein, a domain is a collection of objects in a particular environment. For example, the environment can be a continuous data protection environment and the objects can be data protection appliances, hosts, storage arrays, applications and so forth.

The repositories 108 can obtain information and relationships from any data-source using the expansion agent 128. The repositories 108 include a metadata repository 152 and a rules repository 158. The rules repository 158 stores the rules in a rules repository format. For example, the rules repository 158 stores the rules generated by the user using the GUI 112 that will be used by the event-based analysis engine 102.

The metadata repository 152 stores object types, object hierarchy and the relationships of the objects to each other in an object repository format. In particular, an object is part of an object type and each object is related to one or more other objects.

Each object also has one or more attributes. Any attribute of an object that is monitored and is not part of the object is stored. For example, every "Host" object has its Internet Protocol (IP) attribute that may contain multiple values.

The metadata repository 152 also stores a relationship of an object to its attributes and components (Object Extension) and a relationship between an object to its related cross-domain objects (context).

The repositories 108 collect information from multiple data-sources/domains and are able to validate rules that are (1) from the same domain because the relationship between the objects is retrieved from the data-source/domains and (2) from multiple domains in case the user defines the relationship of the objects from different data-sources/domains.

The GUI component 122 includes an interface that allows the user to define a rule in a few steps. For example, the user selects a required object, configures a condition to trigger an alert and defines the alert (see FIG. 2A, for example). In one example, the condition may include filter, merge, statistical, lack of event, change management and prediction operators. The GUI component 122 saves the information in a GUI format and sends it through the translator 116 to the repositories 108. When the user selects an object the user can choose any attribute of the selected object or an attribute of any of its parents. For example when the user selected a disk of a host the user will be able to use in the trigger any attribute of the disk (selected object) and any attribute of it parent (host).

Additionally, when the user selects an object the user can choose any attribute or can navigate from the selected object to any of its related objects as described further herein.

The translator 116 translates the information from the GUI format that includes a rule to a format compatible with the rules repository 158, a rules repository format. The translator 116 also converts the objects, events and relationships between the objects from the metadata repository 152 in an object repository format into the GUI format for presentation to the user through the GUI 112. In one example, the GUI format includes a tree of objects (object hierarchy) that is known to the user. In another example, the object hierarchy is configured by the user.

The compiler 122 compiles the rules repository format into a format compatible with the event-based analysis engine rules 102.

The expansion agent 128 enables the addition of new objects into the system 100 including relationships between the new objects and relationships to existing objects. In one example, the expansion agent 108 may be used by external products to have the system monitor & alert on any event that is sent by the external product.

Figure 2A:
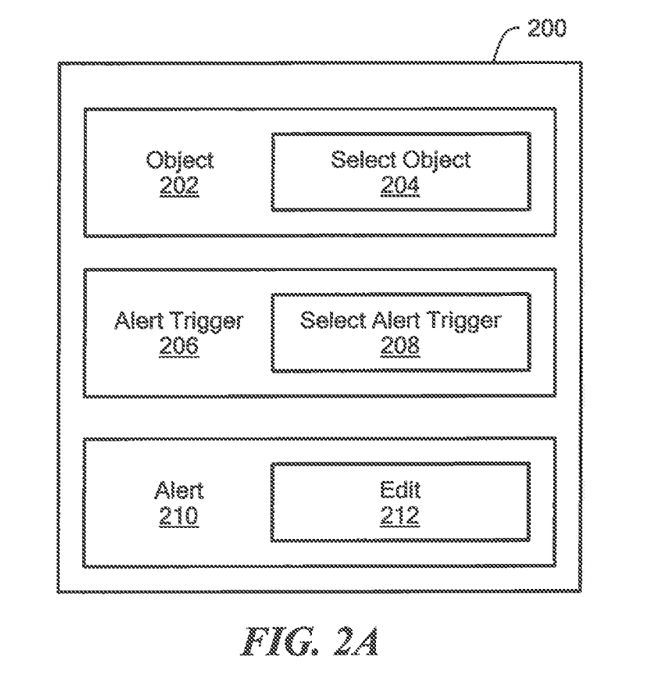
FIG. 2A is a diagram of an example of a window present by a graphical user interface for a user to generate a rule.

Referring to FIG. 2A, in one example, a user is presented a window 200 by the GUI 112 that includes an object section 202, an alert trigger section 206 and an alert section 210. The object section 202 includes a select object portion 204 that a user activates to select an object (or several objects). In one example, the select object portion 204 is a hypertext or a button that a user activates using a mouse, for example. By activating the select object portion 204 the user may choose from a list of objects.

Figure 2B:
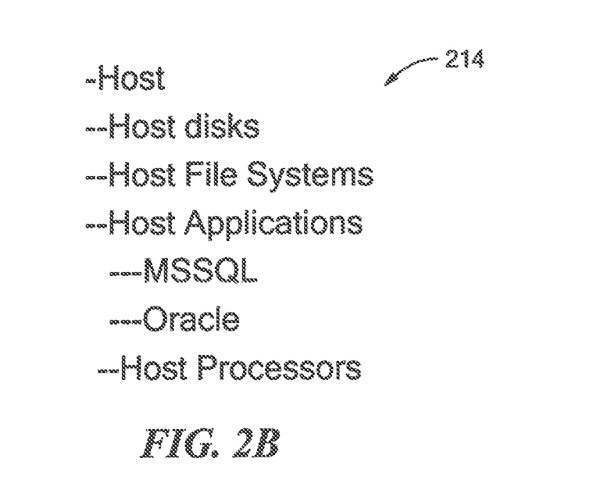
FIG. 2B is a diagram of an example of an object tree hierarchy rendered by the GUI.

Referring to FIG. 2B, in one example, after the user activates the select object portion 204, the user is presented with an object hierarchy tree, for example, a hierarchy tree 214.

The alert trigger section 206 includes a select alert trigger portion 206 that a user activates to select an alert trigger. In one example, the select alert trigger portion 206 is a hypertext or a button that a user activates using a mouse, for example. By activating the select alert trigger portion 206 the user may choose from a list of alert triggers. The user can also configure the condition which triggers the alert. For example, if a utilization of a host exceeds 96%, trigger the alert.

Figure 2C:
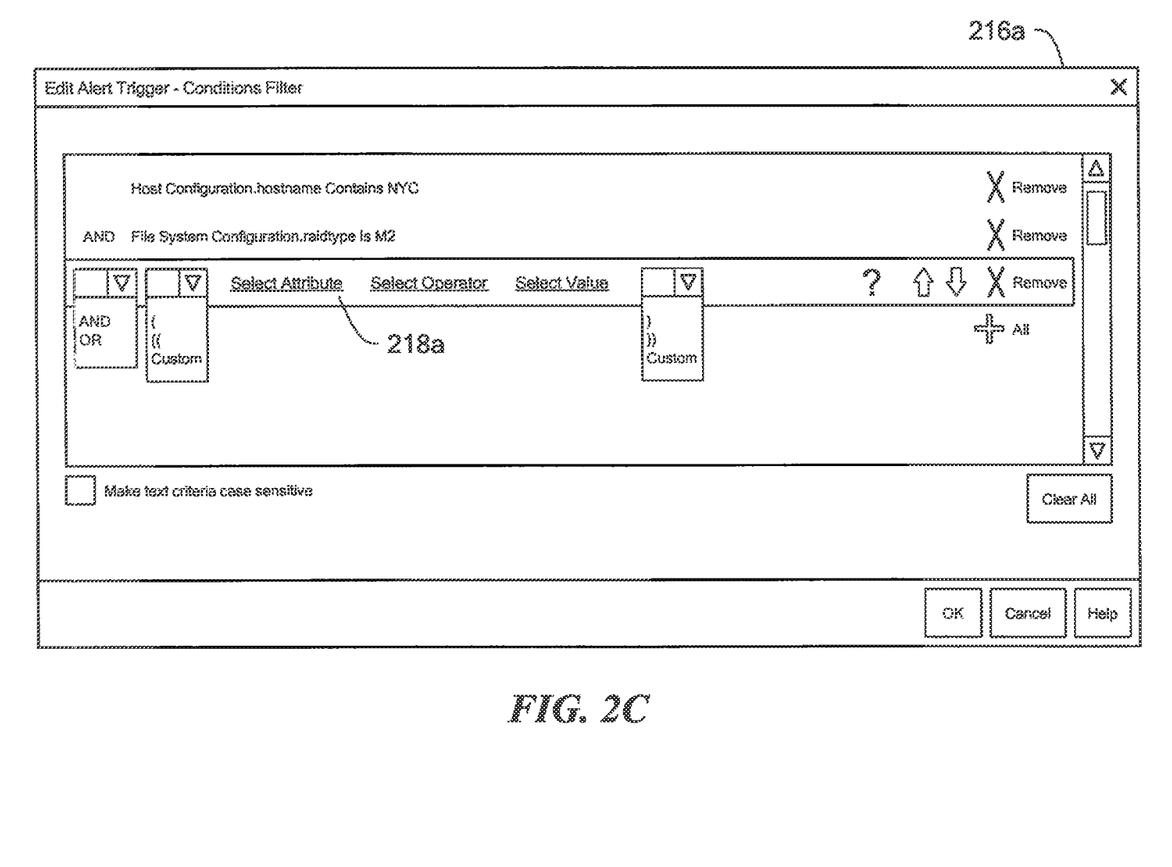
FIGS. 2C to 2E are windows from a GUI to edit an alert trigger.

Referring to FIG. 2C, in one example, by activating the alert trigger portion 206 the GUI 112 renders a window 216*a* to filter a condition. The window 216*a* allows the user to select an attribute, an operator and a value of the alert trigger. The window 216*a* allows the user to select an attribute by activating a "Select Attribute" hypertext 218*a*.

Figure 2D:
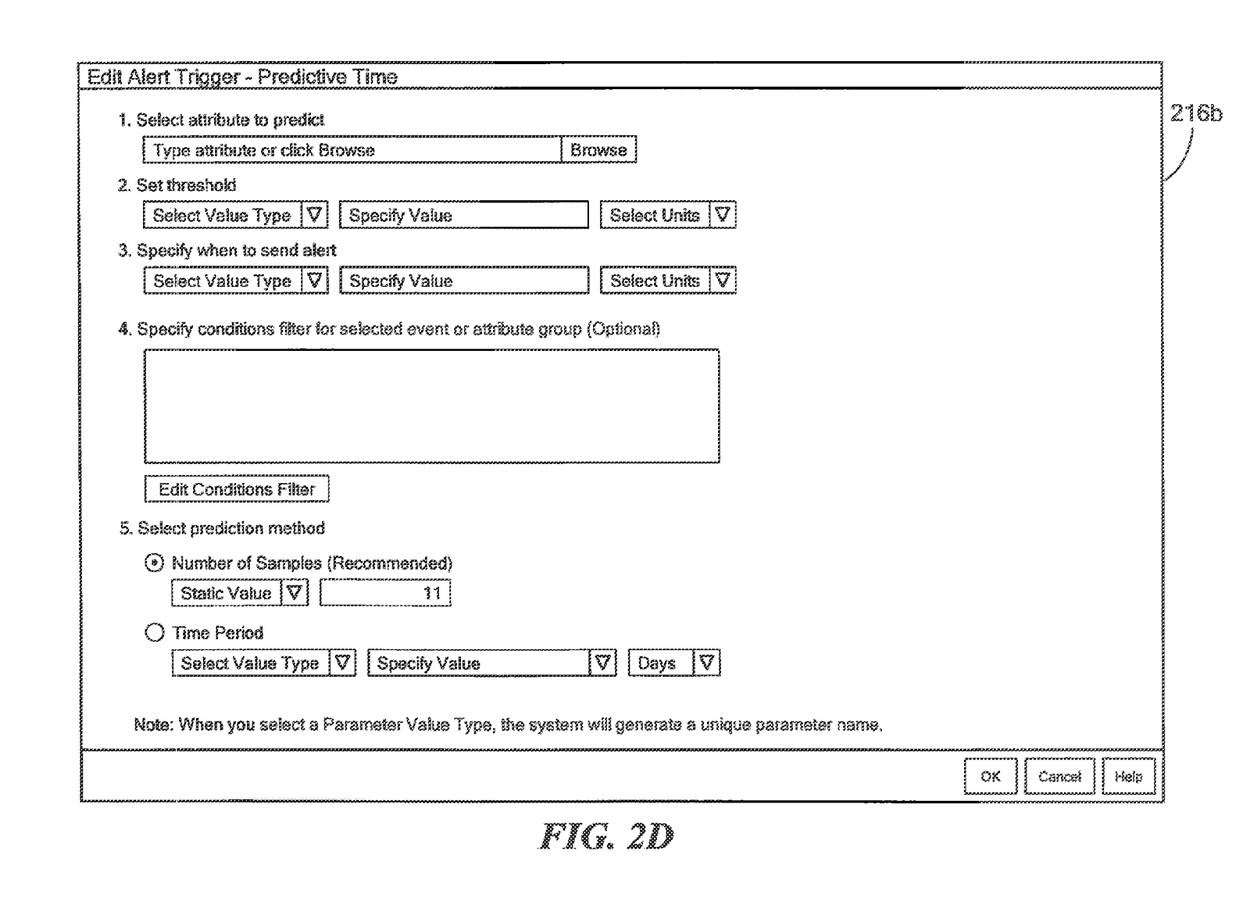

Referring to FIG. 2D, a window 216*b* may also be presented to the user to allow the user to select an attribute to predict, set the threshold, specify when to send the alert, specify conditions to filter for a selected event or attribute group and to select prediction method.

Figure 2E:
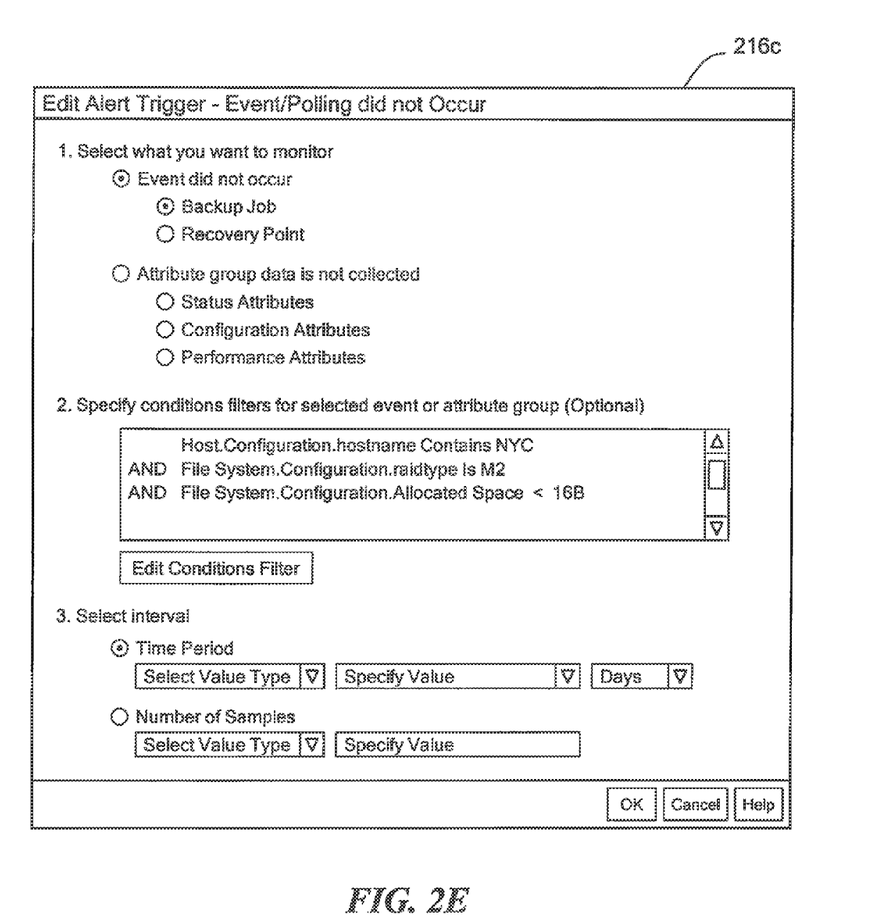

Referring to FIG. 2E, a window 216*c* may also be presented to the user to select what to monitor, specify conditions to filter for select event or attribute group and to select an interval to monitor.

Referring back to FIG. 2A, the alert section 210 includes an edit portion 212 that a user activates to edit an alert. In one example, the edit portion 212 is a hypertext or a button that a user activates using a mouse, for example. By activating the edit portion 212 the user may edit an alert. For example, user may define the alert. The alert may be a message sent to the user. In one example, the user is presented with several ways to present the alert if triggered.

Figure 2F:
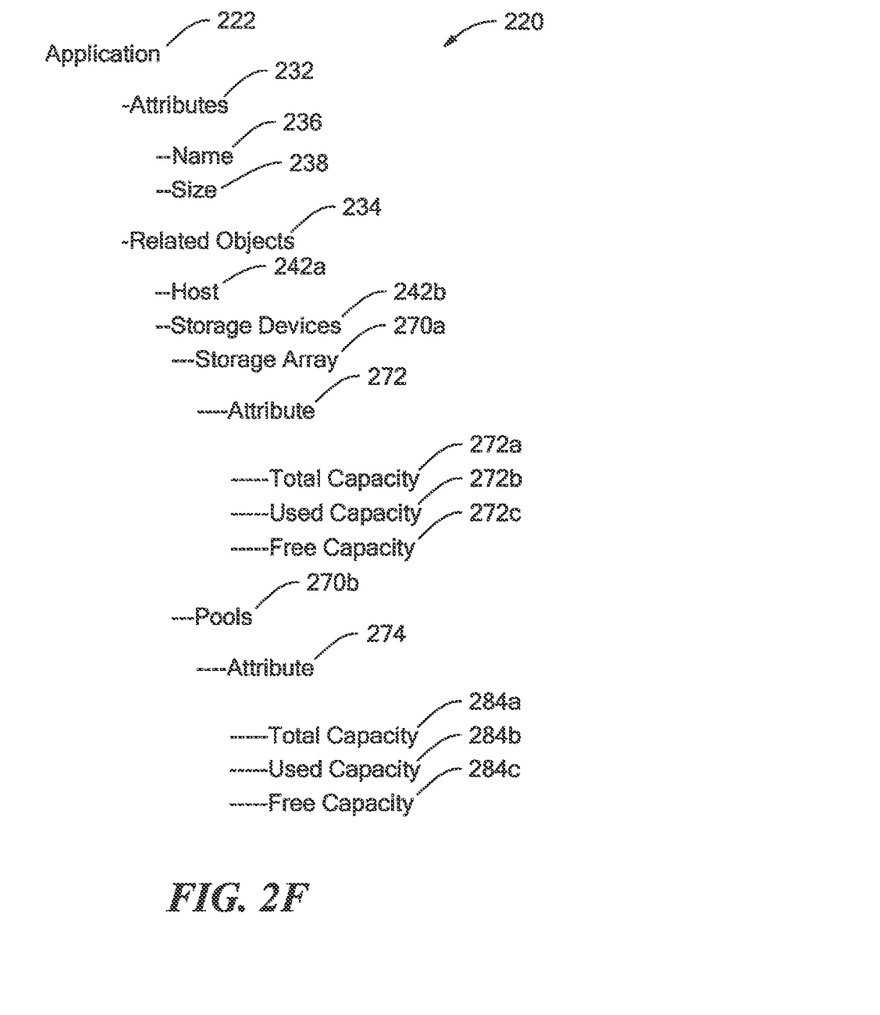
FIG. 2F is a diagram of an example of an object tree hierarchy rendered by the GUI to combine related objects.

Referring to FIG. 2F, in one example, after the user activates the select object portion 204, the user is presented with a list of objects. When the user selects an object from the list of objects, a hierarchical tree of the project is presented.

Since an alert may be based on more than one object, the user may be able to assign a related object without understanding or knowing how the objects are related. Using the GUI 112, the user is able to generate rules for the event-based analysis engine without the need to choose the different objects and specify the relationships and the conditions; but rather, just to get the relationship automatically by looking for the object attributes or related data. For example, the user wants to see how much free space is left for an application on the storage arrays. The user chooses this application and then navigates through the related objects to the attributes the user wishes to utilize. By navigating through the object's hierarchical tree and its related objects, the user can easily find all the attributes that he would like to monitor or display in the report without the need to understand the object model structure and to define the relationship and condition between the different objects.

The GUI 112 using the GUI format presents objects, object hierarchy, events and relationships in a manner that is familiar to the user and is intuitive in the way the user can find the related object according to its contexts. For example, when a user would like to observe the backup jobs of a host (the host and backup jobs are objects and events from different domains), the user will go to the host and will be able to select the related backup jobs of the host, without the need to define the relationship between them.

In one particular example, an object tree 200 includes a hierarchy for an object, for example, an application object 222. A second level of the object tree 200 under the application object 222 includes attributes 232 and related objects 234. The attributes 232 include a name 236 and size 238 parameters in the third level of the object tree 200.

The related objects 234 includes object types that are related to the application in the third level of the object tree 200. For example, the object types include a host object type 242a and storage devices object type 242b in the fourth level of the object tree 200. The storage devices object type 242b includes objects such as storage array 270a and pools 270b in the fifth level of the object tree 200. Each object includes an attribute. For example, the storage array 270a includes an attribute 272 which includes total capacity 272a, used capacity 272b and free capacity 272c and the pools 270a includes an attribute 274 which includes total capacity 284a, used capacity 284b and free capacity 284c.

Using the object tree 200, a user can tie an application object to its related object, a storage array and be able to use the attributes for the storage array to establish a rule.

Figure 3:
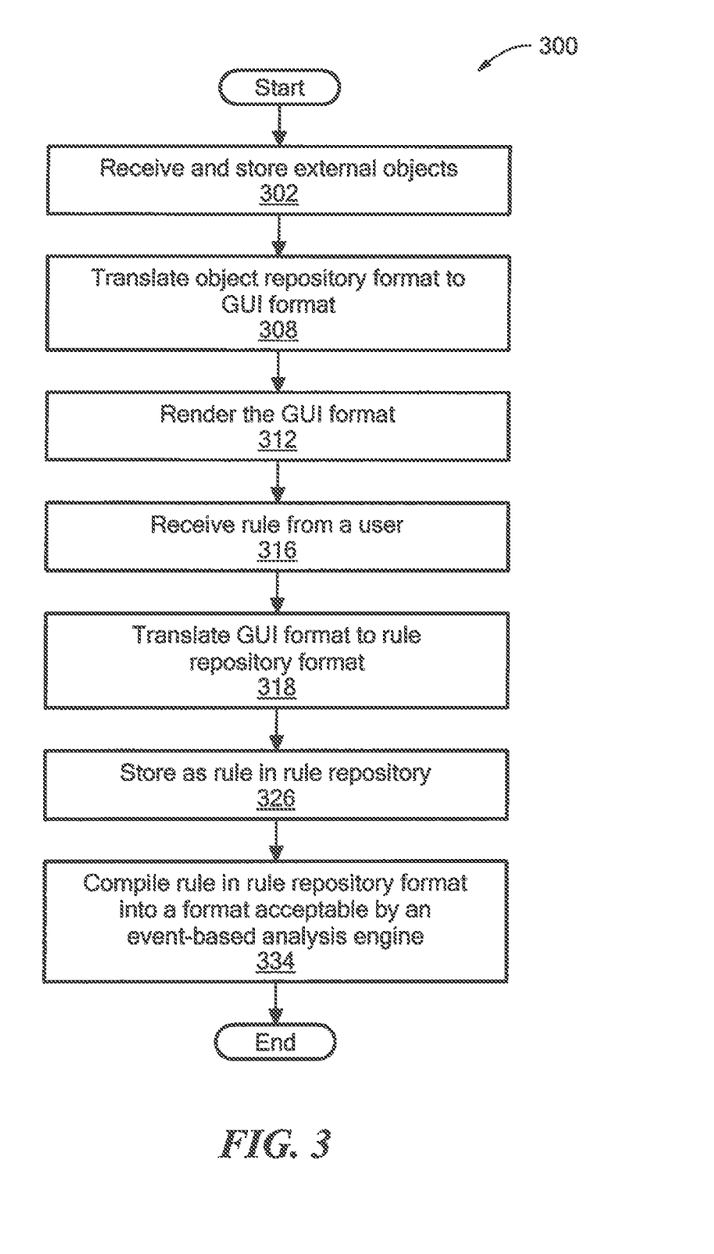
FIG. 3 is a flowchart of an example of a process to generate a rule for an event-based analysis engine.

Referring to FIG. 3, an example of a process to generate a rule for an event-based analysis engine is a process 300. Process 300 receives and stores external objects (302). For example, the expansion agent 128 receives objects from external sources and sends the received objects to the repositories 108 for storage.

Process 300 translates data from the repositories 108 to the GUI format (308). For example, the translator 116 translates objects, objects types and the relationships of the objects from the metadata repository 152 in the object repository format into a GUI format for presentation to the user through the GUI 112. Process 300 renders the GUI format to the user (312) and receives input from the user using the GUI 112 (316). The input from the user forms a rule that will be executed by the event-based analysis engine 102.

Process 300 translates the GUI format containing the rule into the rule repository format (318) and stores the rule in the rule repository 158 (326). For example, the translator 116 translates the GUI format into the rule repository format. Process 300 compiles, using the compiler 122, the rule in the rule repository format into a format acceptable by the event-based analysis engine 102 (334).

Figure 4:
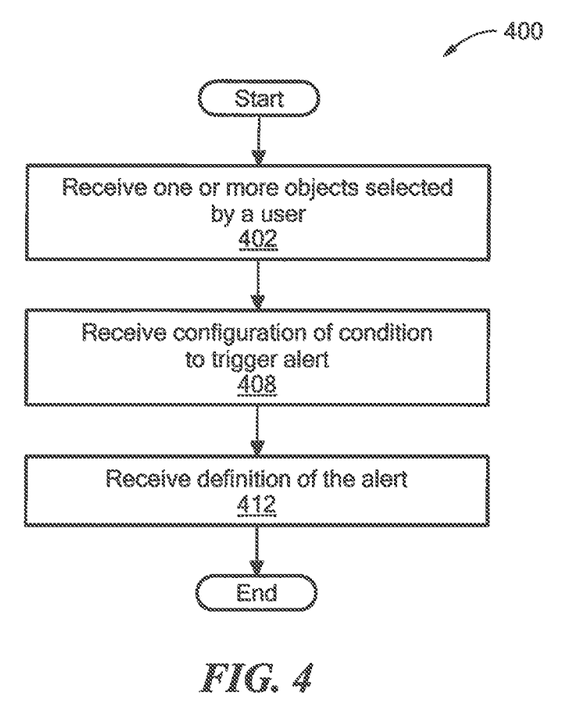
FIG. 4 is a flowchart of an example of a process to receive a rule from a user using the GUI.

Referring to FIG. 4, an example of a process to receive a rule from a user using the GUI 112 is a process 400. Process 400 receives one or more objects selected by the user (402). For example, the user uses the window 200 and activates the select object portion 204. In one example, the user is presented a hierarchical tree and selects one or more objects.

Process 400 receives a configuration of a condition to trigger the alert (408). For example, the user uses the window 200 and activates the select alert trigger portion 208. In one example, the user is presented with different conditions and the user selects which condition to use and the specific parameters.

Process 400 receives a definition of the alert (412). For example, the user, using the window 200, activates the select edit portion 212. In one example, the user defines the alert. For example, the user is presented with a series of alert options and the user selects one of the alert options to define the alert.

Figure 5:
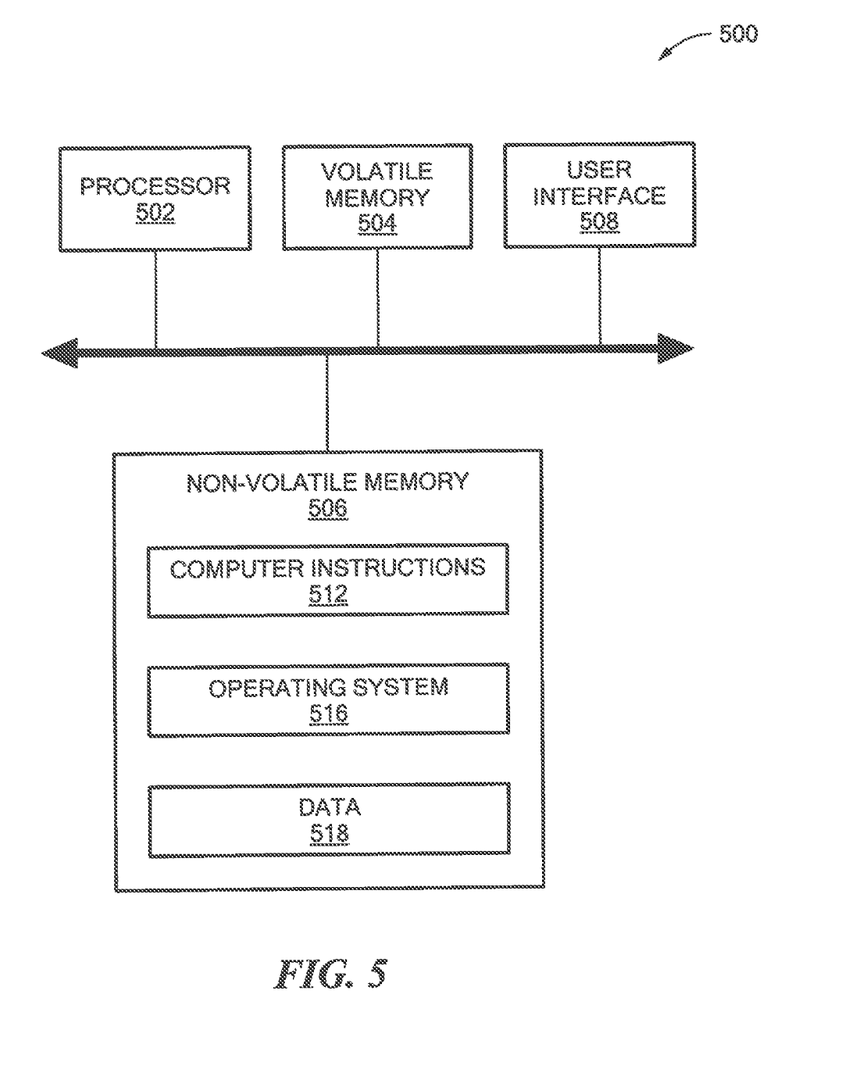
FIG. 5 is a block diagram of a computer on which any of the processes of FIGS. 3 and 4 may be implemented.

Referring to FIG. 5, an example of a computer to perform any of the processes described herein is a computer 500. The computer 500 includes a processor 502, a volatile memory 504, a non-volatile memory 506 (e.g., hard disk) and a user interface (UI) 508 (e.g., a GUI 112 that includes at least one of a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., the processes 300 and 400).

The processes described herein (e.g., the processes 300 and 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The system and processes described herein are not limited to the specific examples described. For example, the processes 300 and 400 are not limited to the specific processing order of FIGS. 3 and 4, respectively. Rather, any of the processing blocks of FIGS. 3 and 4 may be re-ordered, combined or removed, performed in parallel or in serial, as necessary, to achieve the results set forth above.

The processing blocks (for example, in the process 300 of FIG. 3 and in the process 400 of FIG. 4) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
receiving and storing objects in a metadata repository in an object repository format, the objects being objects from a continuous data protection domain and comprising a host, a storage array, an application and a data protection appliance, each object have one or more attributes and one or more components, the metadata repository storing a relationship of an object to the one or more attributes of the object, a relationship of the object to the one or more components of the object and a relationship between the object to related cross-domain objects of the object;
translating the objects and the relationships from the object repository format in the metadata repository to a graphical user interface (GUI) format using a translator coupled to the metadata repository and a GUI;
rendering the objects and the relationships in the GUI format on the GUI to a user, wherein rendering the objects and the relationships in the GUI format to a user comprises rendering the objects and the relationships in an object hierarchy tree to enable a user to select an object and a related object in the object hierarchy tree to define a rule;
receiving the rule from the user using the GUI format;
translating the rule in the GUI format to a rule repository format using the translator;
storing the rule in the rule repository format in a rule repository coupled to the translator;
compiling the rule in the rule repository format into a format that is acceptable for processing by an event based analysis engine; and
executing the rule by the event based analysis engine.

2. The method of claim 1 wherein receiving and storing objects comprises receiving and storing objects comprising components in a network comprising at least one of a host, a storage array and an application.

3. The method of claim 1 wherein rendering the GUI format comprises rendering to a user a GUI that allows the user to:
select one or more of the objects;
configure a condition to trigger an alert; and
define the alert.

4. The method of claim 1 wherein rendering the GUI format to a user comprises rendering a GUI format that allows a user to edit an alert trigger by allowing the user to select an attribute, an operator and a value of the alert trigger.

5. The method of claim 1 wherein rendering the GUI format to the user comprises rendering a GUI format that allows a user to edit an alert trigger by allowing the user to select an event to monitor.

6. The method of claim 1, wherein receiving and storing objects in a metadata repository comprises receiving and storing objects in a metadata repository configured to store object types, object hierarchy, the relationships of the objects to each other in the object repository format and a relationship of an object to its attributes and components; and to store a relationship between an object to its related cross-domain objects.

7. The method of claim 1 wherein rendering the GUI format to the user comprises rendering a GUI format that allows a user to edit an alert trigger by allowing the user to select an attribute to predict, set the threshold, specify when to send the alert, specify conditions to filter for a selected event and to select a prediction method.

8. An article comprising:
a non-transitory machine-readable medium that stores executable instructions, the instructions causing a machine to:
receive and store objects in a metadata repository in an object repository format, the objects being objects from a continuous data protection domain and comprising a host, a storage array, an application and a data protection appliance, each object have one or more attributes and one or more components, the metadata repository storing a relationship of an object to the one or more attributes of the object, a relationship of the object to the one or more components of the object and a relationship between the object to related cross-domain objects of the object;
translate the objects and the relationships from the object repository format in the metadata repository to a graphical user interface (GUI) format using a translator coupled to the metadata repository and a GUI;
render the objects and the relationships in the GUI format on the GUI to a user, wherein the instructions causing the machine to render the objects and the relationships in the GUI format to a user comprises instructions causing the machine to render the objects and the relationships in an object hierarchy tree to enable a user to select an object and a related object in the object hierarchy tree to define a rule;
receive a rule from the user using the GUI format;
translate the rule in the GUI format to a rule repository format using the translator;
store the rule in the rule repository format in a rule repository coupled to the translator;
compile the rule in the rule repository format into a format that is acceptable for processing by an event based analysis engine; and
execute the rule by the event based analysis engine.

9. The article of claim 8 wherein the instructions causing a machine to receive and store objects comprises instructions causing a machine to receive and store objects comprising components in a network comprising at least one of a host, a storage array and an application.

10. The article of claim 8 wherein the instructions causing a machine to render the GUI format comprises instructions causing a machine to render to a user a GUI that allows the user to:
select one or more of the objects;
configure a condition to trigger an alert; and
define the alert.

11. The article of claim 8 wherein the instructions causing a machine to render the GUI format to a user comprises instructions causing a machine to render a GUI format that allows a user to edit an alert trigger by allowing the user to select an attribute, an operator and a value of the alert trigger.

12. The article of claim 8 wherein the instructions causing a machine to render the GUI format to the user comprises instructions causing a machine to render a GUI format that allows a user to edit an alert trigger by allowing the user to select an event to monitor.

13. The article of claim 8, wherein the metadata repository is configured to store object types, object hierarchy, the relationships of the objects to each other in the object repository format and a relationship of an object to its attributes and components; and to store a relationship between an object to its related cross-domain objects.

14. An apparatus, comprising:
circuitry configured to:
receive and store objects in a metadata repository in an object repository format, the objects being objects from a continuous data protection domain and comprising a host, a storage array, an application and a data protection appliance, each object have one or more attributes and one or more components, the metadata repository storing a relationship of an object to the one or more attributes of the object, a relationship of the object to the one or more components of the object and a relationship between the object to related cross-domain objects of the object;
translate the objects and the relationships from the object repository format in the metadata repository to a graphical user interface (GUI) format using a translator coupled to the metadata repository and a GUI;
render the objects and the relationships in the GUI format on the GUI to a user, wherein the circuitry configured to render the objects and the relationships in the GUI format to a user comprises circuitry configured to render the objects and the relationships in an object hierarchy tree to enable a user to select an object and a related object in the object hierarchy tree to define a rule;
receive a rule from the user using the GUI format;
translate the rule in the GUI format to a rule repository format using the translator;
store the rule in the rule repository format in a rule repository coupled to the translator;
compile the rule in the rule repository format into a format that is acceptable for processing by an event based analysis engine; and
execute the rule by the event based analysis engine.

15. The apparatus of claim 14 wherein the circuitry comprises at least one of a processor, a memory, programmable logic and logic gates.

16. The apparatus of claim 14 wherein the circuitry to receive and store objects comprises circuitry to receive and store objects comprising components in a network comprising at least one of a host, a storage array and an application.

17. The apparatus of claim 14 wherein the circuitry to render the GUI format comprises circuitry to render to a user a GUI that allows the user to:
select one or more of the objects;
configure a condition to trigger an alert; and
define the alert.

18. The apparatus of claim 14 wherein the circuitry to render the GUI format to a user comprises circuitry to render a GUI format that allows a user to edit an alert trigger by allowing the user to select an attribute, an operator, a value of the alert trigger and an event to monitor.

19. The apparatus of claim 14, wherein the metadata repository is configured to store object types, object hierarchy, the relationships of the objects to each other in the object repository format and a relationship of an object to its attributes and components; and to store a relationship between an object to its related cross-domain objects.

* * * * *